(12) United States Patent
Jeanroy et al.

(10) Patent No.: US 8,210,023 B2
(45) Date of Patent: Jul. 3, 2012

(54) METHOD FOR CALIBRATING A SCALE FACTOR IN AN AXISYMMETRICAL VIBRATING GYROMETER

(75) Inventors: Alain Jeanroy, Conflans Sainte-Honorine (FR); Alain Renault, Pontoise (FR); Jean-Michel Caron, Saint-Gratien (FR)

(73) Assignee: Sagem Defense Securite, Paris (FR)

( * ) Notice: Subject to any disclaimer, the term of this patent is extended or adjusted under 35 U.S.C. 154(b) by 436 days.

(21) Appl. No.: 12/520,335

(22) PCT Filed: Dec. 12, 2007

(86) PCT No.: PCT/FR2007/002044
§ 371 (c)(1),
(2), (4) Date: Nov. 18, 2009

(87) PCT Pub. No.: WO2008/090275
PCT Pub. Date: Jul. 31, 2008

(65) Prior Publication Data
US 2010/0058831 A1     Mar. 11, 2010

(30) Foreign Application Priority Data

Dec. 20, 2006   (FR) ...................................... 06 11155

(51) Int. Cl.
*G01P 21/00*   (2006.01)

(52) U.S. Cl. .......................................... 73/1.37; 702/96
(58) Field of Classification Search .................. 73/1.37, 73/1.82; 702/88, 96
See application file for complete search history.

(56) References Cited

U.S. PATENT DOCUMENTS

| | | | |
|---|---|---|---|
| 5,712,427 A | 1/1998 | Matthews | |
| 7,526,398 B1* | 4/2009 | Choi et al. | 702/104 |
| 7,739,896 B2* | 6/2010 | Stewart | 73/1.37 |
| 8,037,758 B2* | 10/2011 | Sato | 73/504.12 |
| 8,136,382 B2* | 3/2012 | Stewart | 73/1.37 |
| 2005/0257596 A1 | 11/2005 | Fell et al. | |

* cited by examiner

*Primary Examiner* — Thomas P Noland
(74) *Attorney, Agent, or Firm* — Muncy, Geissler, Olds & Lowe, PLLC

(57) ABSTRACT

The method of calibrating a scale factor of an axially-symmetrical vibrating rate gyro operating by applying an amplitude control signal (CA) and a precession control signal (CP) to a vibrator member (1) set into vibration at a given frequency comprises a pre-calibration step consisting in calculating a reference gain ratio between a drive gain (Gmx) in a first direction and a drive gain (Gmy) in a second direction in modal quadrature with the first direction, and in storing the reference gain ratio, and a calibration step consisting in calculating a value for a measurable magnitude associated with the scale factor by a proportionality relationship including the reference gain ratio, and calculating a corrected scale factor on the basis of the value of the measurable magnitude and the stored reference gain ratio.

6 Claims, 1 Drawing Sheet

METHOD FOR CALIBRATING A SCALE FACTOR IN AN AXISYMMETRICAL VIBRATING GYROMETER

The present invention relates to a method of calibrating a scale factor of an axially-symmetrical vibrating rate gyro.

BACKGROUND OF THE INVENTION

It is known that an isotropic vibrating rate gyro is constituted by an axially-symmetrical resonator having two degrees of freedom.

The vibrator member of the resonator is set into vibration at the resonant frequency of the vibrator member by an amplitude control signal. To control the orientation of the vibration, a precession control signal is also applied to the vibrator member so that a measurement of the vibration of the vibrator member and demodulation of said vibration at the resonant frequency of the vibrator member make it possible, in application of appropriate equations, to determine the speed of rotation to which the resonator is subjected.

The amplitude control signal and the precession control signal are applied via control electrodes that present drive gain, i.e. the ratio of the amplitude of the force generated by the control signal to the amplitude of that control signal. Similarly, the outlet signal is measured by detector electrodes presenting detector gain, which is the ratio of the vibration amplitude to the corresponding amplitude of the output signal.

The accuracy with which the speed of rotation is calculated is a function of the accuracy of the scale factor of the resonator, where the scale factor is the ratio of the speed of rotation of the resonator to the precession control or to an equivalent output signal.

It is observed that the scale factor varies as a function of the temperature to which the resonator is subjected, and also varies over time as a function of component aging. These variations affect measurement accuracy.

In order to improve the precision of the scale factor, it is known to store tables in the processor unit of the gyro, which tables specify variations in the scale factor as a function of temperature and as a function of resonator age. When the gyro is in use, a temperature measurement thus makes it possible to calibrate the scale factor. Nevertheless, the tables are established on the basis of a predictive model that is not satisfactory, and as a result differences can exist between the variations in the scale factor as stored and the real variations in the scale factor while a gyro is in use.

OBJECT OF THE INVENTION

The object of the invention is to calibrate the scale factor of a rate gyro from the gyro itself.

SUMMARY OF THE INVENTION

In order to achieve this object, the invention provides a method of calibrating a scale factor of an axially-symmetrical vibrating rate gyro operating by applying an amplitude control signal and a precession control signal to a vibrator member set into vibration at a given frequency, the method comprising a pre-calibration step consisting in calculating a reference gain ratio between a drive gain in a first direction and a drive gain in a second direction in modal quadrature with the first direction, and in storing the reference gain ratio, and a calibration step consisting in calculating a value for a measurable magnitude associated with the scale factor by a proportionality relationship including the reference gain ratio, and calculating a corrected scale factor on the basis of the value of the measurable magnitude and the stored reference gain ratio.

It has been found that whereas the drive gain in each direction varies as a function of temperature and varies over time, the ratio of the drive gains in two directions that are in modal quadrature can be considered as being constant at the degree of accuracy that is usually desired. It is therefore possible to determine the reference gain ratio accurately in a workshop. An instantaneous measurement of the measurable magnitude then enables the scale factor of the gyro to be calibrated at its time of use. The method of the invention is particularly advantageous when the gyro is configured to be implemented as described in document FR-A-2 851 041 (or the equivalent U.S. Pat. No. 7,010,977) since the amplitude control signal and the precession control signal are applied to the same electrodes so the drive gain ratio remains equal to 1 whatever the temperature and/or the elapsed time.

In a first implementation of the invention, the measurable magnitude is a variation in the vibration frequency as a function of a variation in a stiffness control signal applied to at least one control electrode. Preferably, the stiffness control signal is in time quadrature with the amplitude control signal and the precession control signal, and the stiffness control signal is in modal quadrature geometrically with the precession control signal. Thus, the precession control signal is disturbed very little by the stiffness signal, so the stiffness signal can be applied permanently.

In another implementation of the method of the invention, the measurable magnitude is an amplitude variation as a function of a variation in the amplitude control signal.

BRIEF DESCRIPTION OF THE DRAWING

Other characteristics and advantages of the invention appear on reading the following description of two particular and non-limiting implementations of the invention given with reference to the accompanying figures, in which.

DETAILED DESCRIPTION OF THE INVENTION

Figure 1:
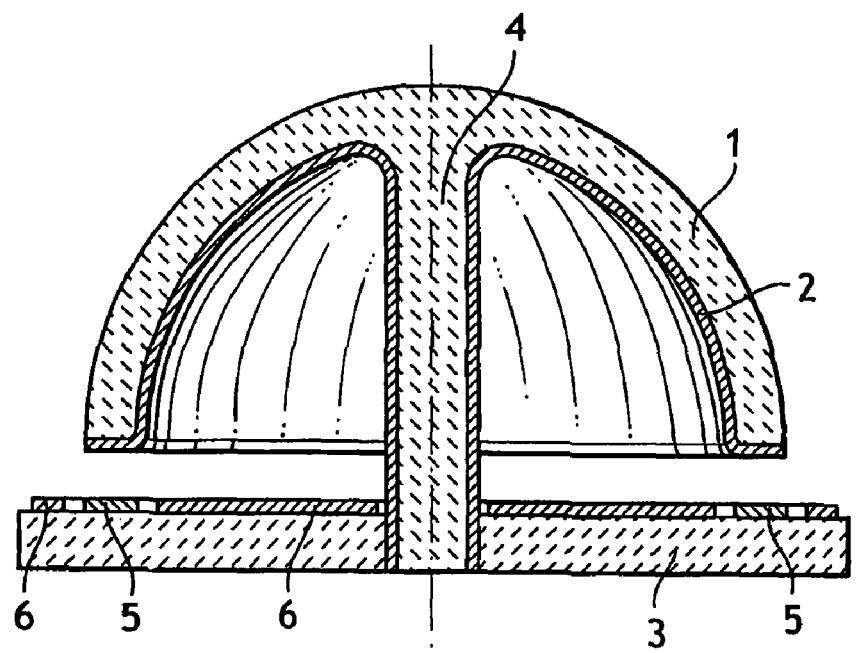
FIG. 1 is a diagrammatic section view of a hemispherical resonator suitable for use in implementing the method of the invention.

With reference to FIG. 1, the calibration method of the invention can be implemented with any isotropic vibrating rate gyro comprising an axially-symmetrical resonator with two degrees of freedom, in particular a resonator comprising in known manner a hemispherical vibrator member 1, e.g. a bell made of silica and fastened via a stem 4 to a base 3. The inside surface of the bell 1 and also the edge thereof and the stem 4 are covered in a metal layer 2. The base 3 carries electrodes 5, each of which can be dedicated to a control or detection function, or each of which can be multiplexed to alternate between a control function and a detection function. The electrodes face the edge of the vibrator member 1. The resonator also includes a guard electrode 6. To be used as a rate gyro, the vibrator member is initially set into vibration by applying an amplitude control signal CA, and the resulting vibration is oriented by means of a precession control signal CP.

In a first implementation of the invention, an alternating stiffness control signal CR is also applied to at least one control electrode. The stiffness control signal is preferably applied in time quadrature with the amplitude control signal CA and with the precession control signal CP. The stiffness control signal CR is also in modal quadrature geometrically with the precession control signal CP, i.e. when vibration is sustained at the resonant frequency of the vibrator member 1, the stiffness control signal CR is applied to control electrodes disposed at 90° to the control electrodes that receive the precession control signal, whereas if the vibrator member is excited at a frequency that is twice the resonant frequency, then the stiffness control signal CR is applied to control electrodes located at 45° relative to the control electrodes that receive the precession control signal.

The controlling electronics serve to adjust the control signals so that the amplitude of the vibration corresponds to a setpoint value Ac in a first direction $\underline{x}$, while the amplitude of the vibration is zero along a second direction $\underline{y}$ in modal quadrature with the first direction $\underline{x}$. The $\underline{x}$ force corresponds to the amplitude control CA and the $\underline{y}$ force corresponds to the precession control CP. The value of the CP control is a measure of the speed $\Omega$. The following motion equations are then obtained along the directions $\underline{x}$ and $\underline{y}$:

$$m.x''+f.x'+r.x=CA.x'+CR.x \quad (1)$$

$$0=2.m.x'\Omega+F_y \quad (2)$$

where m is the mass of the vibrator member 1, f is the damping of the vibration, r is the stiffness of the vibrator member, $\Omega$ is the speed of rotation to be measured, and $F_y$ is the force in the y direction.

Furthermore, in the presence of the stiffness control, the frequency of the resonator is given by the equation:

$$\omega = \sqrt{\frac{r-CR}{m}} \quad (3)$$

where $$dCR=2.m.\omega.d\omega \quad (4)$$

In practice, given the driving gain Gmx in the direction $\underline{x}$ and the detector gain Gd for measuring the amplitude, equation (4) becomes:

$$2.m.\omega.d\omega=dCR.Gmx.Gd \quad (5)$$

from which it is possible to deduce the ratio V of variation in the frequency of vibration relative to variation in stiffness:

$$V = \frac{d\omega}{dCR} = \frac{Gmx \cdot Gd}{2 \cdot m \cdot \omega} \quad (6)$$

Furthermore, to a first approximation of the trigonometrical values it contains, x' can be written in the form:

$$x'=\omega.Ac/Gd$$

In addition, by introducing the driving gain Gmy in the $\underline{y}$ direction:

$$Fy=CP.Gmy$$

Equation (2) thus becomes:

$$0 = 2 \cdot m \cdot \Omega \cdot \omega \frac{Ac}{Gd} + CP \cdot Gmy \quad (7)$$

from which the scale factor Gfe can be deduced as follows:

$$Gfe = \frac{\Omega}{CP} = \frac{Gmy \cdot Gd}{2 \cdot m \cdot \omega \cdot Ac} \quad (8)$$

by extracting the value of the detector gain Gd from equation (6) and putting it into equation (8), the following is obtained:

$$\frac{V}{Gfe} = \frac{Gmx}{Gmy} Ac \quad (9)$$

where V is a magnitude that is measurable by causing the stiffness control to vary and by calculating the corresponding variation in the vibration frequency.

As shown above, the ratio of the x drive gain to the y drive gain is constant, such that for an identical setpoint Ac for measurement the ratio V/Gfe remains constant, both in a workshop and while calibrating the scale factor. In practice, the ratio Gmx/Gmy is measured in the workshop and is stored in a memory of the processor unit of the resonator. When it is desired to calibrate the scale factor Gfe, it then suffices to measure the instantaneous value of V and to select an amplitude setpoint Ac that is identical to that which was used when calculating the ratio of the drive gain, thus making it possible to calculate the corrected scale factor Gfe from equation (9).

This calibration technique is suitable for sensors in which the amplitude of the stiffness control CR gives rise to variations in frequency that are large compared with the variations in frequency caused by variations in the temperature of the resonator. This implementation of the method of the invention can thus be used in particular with gyros of the quapason type.

Figure 2:
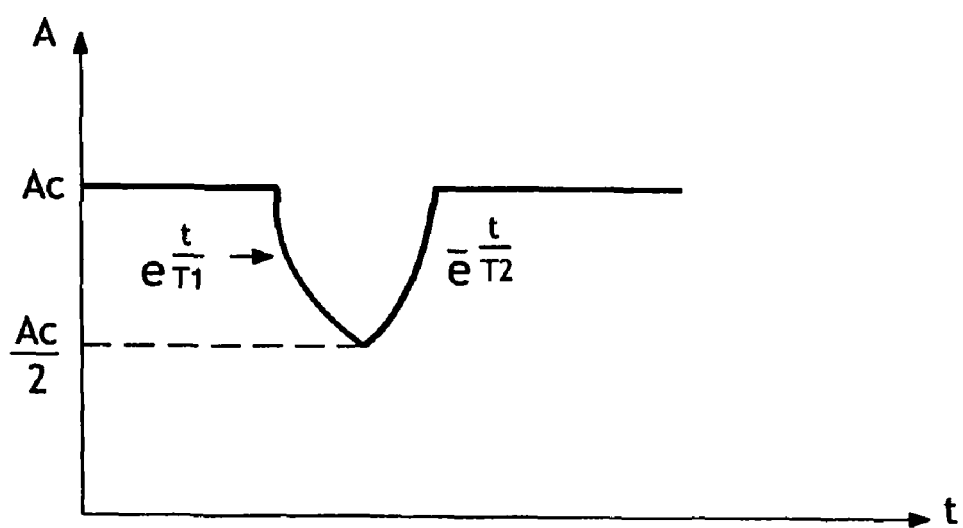
FIG. 2 is a diagram showing how amplitude varies when performing calibration in accordance with the second implementation of the invention.

For gyros in which the frequency variation during variations in the stiffness control is not sufficient, in particular for hemispherical resonant gyros, a second implementation of the method of the invention is used that is based on varying the amplitude control. In normal operation, the processor electronics is configured to maintain the amplitude of the vibration at a constant setpoint value Ac. When the amplitude control CA is replaced by a signal proportional to the amplitude of the vibration, amplitude varies as a decreasing exponential of exponent t/T1 where T1 is the time constant of the decreasing exponential, as shown in FIG. 2. This control is maintained until the amplitude reaches a predetermined low threshold, AC/2 for example as shown in FIG. 2. When the amplitude reaches the low threshold, the amplitude control is inverted and amplitude varies as a rising exponential of exponent −t/T2 where T2 is the time constant of this second exponential. The expressions for the time constants in the mechanical system are given by the following second order equations:

$$\frac{1}{T1} = \frac{CA \cdot Gmx \cdot Gd}{2 \cdot m \cdot \omega} - \frac{\omega}{2Q} \quad (10)$$

$$\frac{1}{T2} = \frac{CA \cdot Gmx \cdot Gd}{2 \cdot m \cdot \omega} + \frac{\omega}{2Q} \quad (11)$$

From these two equations, the electromechanical efficiency coefficient is obtained:

$$C = 0.5\left[\frac{1}{T1} + \frac{1}{T2}\right] = \frac{CA\, Gmx\, Gd}{2\cdot m\cdot \omega} \quad (12)$$

From equations (8) and (12), and after simplification, the following ratio is obtained:

$$\frac{C}{Gfe} = \frac{CA\cdot Ac\cdot Gmx}{Gmy} \quad (13)$$

In the same manner as above, the ratio C/Gfe depends directly on the constant ratio Gmx/Gmy.

Since the ratio Gmx/Gmy has already been measured in the workshop and stored in the processor unit, when it is desired to calibrate the scale factor, amplitude control is replaced by a signal that is proportional to the amplitude of the vibration. Successive points of the decreasing exponential are measured, thereby enabling the time constant T1 to be measured on the basis of models stored in the processor unit. When the amplitude of the vibration reaches the low threshold, the amplitude control is inverted and successive amplitude variation points are measured in order to determine the time constant T2 of the rising exponential. It is then possible to calculate the electromechanical efficiency coefficient C given by equation (12). The value of C is then put into equation (13) from which the up-to-date value of the scale factor is extracted.

When the amplitude control is applied to the control electrodes at the resonant frequency of the vibrator member, the detected signal complies with the above equations.

When the amplitude control and the precession control are delivered at a frequency that is twice the resonant frequency of the vibrator member, the control electrodes generate electrostatic pressure for which the expression can be reduced to a single term proportional to amplitude, which means that by applying an amplitude control CA that is constant to the control electrodes, the electromechanical efficiency coefficient C is reduced to the following expression:

$$C = \frac{CA\cdot Gmx}{2\cdot m\cdot \omega} \quad (14)$$

such that the ratio C/Gfe is simplified in application of the equation:

$$\frac{C}{Gfe} = \frac{CA\, gmx}{Gmy} \quad (15)$$

Naturally, the invention is not limited to the implementations described above, and can be subjected to implementation variations that appear to the person skilled in the art without going beyond the ambit of the invention as defined by the claims.

In particular, although in a preferred implementation of the second implementation the low amplitude threshold is selected to be equal to half the amplitude setpoint, thereby making it possible to achieve significant variation in amplitude while performing calibration over a short duration, it is possible to use some other threshold as a function of the operating requirements of the gyro.

What is claimed is:

1. A method of calibrating a scale factor of an axially-symmetrical vibrating rate gyro operating by applying an amplitude control signal (CA) and a precession control signal (CP) to a vibrator member set into vibration at a given frequency, wherein the method comprises a pre-calibration step consisting in calculating a reference gain ratio between a drive gain (Gmx) in a first direction and a drive gain (Gmy) in a second direction in modal quadrature with the first direction, and in storing the reference gain ratio, and a calibration step consisting in calculating a value for a measurable magnitude associated with the scale factor by a proportionality relationship including the reference gain ratio, and calculating a corrected scale factor on the basis of the value of the measurable magnitude and the stored reference gain ratio.

2. A calibration method according to claim 1, wherein the measurable magnitude is a variation in the vibration frequency as a function of a variation in a stiffness control signal applied to at least one control electrode.

3. A calibration method according to claim 2, wherein the stiffness control signal is in time quadrature with the amplitude control signal and the precession control signal, and the stiffness control signal is in modal quadrature geometrically with the precession control signal.

4. A calibration method according to claim 1, wherein the measurable magnitude is an amplitude variation as a function of a variation in the amplitude control signal (CA).

5. A calibration method according to claim 4, wherein the amplitude control signal (CA) is generated to cause a variation in amplitude away from a setpoint amplitude (Ac) to a low amplitude threshold, followed by an inverse variation from the low amplitude threshold up to the setpoint amplitude (Ac).

6. A calibration method according to claim 5, wherein the low amplitude threshold is equal to half the setpoint amplitude.

\* \* \* \* \*